US007440846B2

(12) United States Patent
Irie et al.

(10) Patent No.: US 7,440,846 B2
(45) Date of Patent: Oct. 21, 2008

(54) VEHICLE INFORMATION COLLECTION SYSTEM HAVING POINT ISSUING DEVICE

(75) Inventors: Yoshiko Irie, Tokyo (JP); Takeshi Yamamoto, Tokyo (JP)

(73) Assignee: NEC Corporation (JP)

( * ) Notice: Subject to any disclaimer, the term of this patent is extended or adjusted under 35 U.S.C. 154(b) by 33 days.

(21) Appl. No.: 11/045,257

(22) Filed: Jan. 31, 2005

(65) Prior Publication Data

US 2005/0171683 A1 Aug. 4, 2005

(30) Foreign Application Priority Data

Jan. 30, 2004 (JP) ............................ 2004-023498

(51) Int. Cl.
*G06F 19/00* (2006.01)

(52) U.S. Cl. ....................... 701/200; 702/122; 702/188; 340/500

(58) Field of Classification Search ................. 701/1-2, 701/29-36, 117-119, 200-215; 340/1, 39, 340/994-995.13, 500; 702/122, 188
See application file for complete search history.

(56) References Cited

U.S. PATENT DOCUMENTS

| | | | | |
|---|---|---|---|---|
| 6,922,651 | B2 * | 7/2005 | Endoh | 702/122 |
| 2002/0111725 | A1 * | 8/2002 | Burge | 701/29 |
| 2004/0236476 | A1 * | 11/2004 | Chowdhary | 701/1 |

FOREIGN PATENT DOCUMENTS

| | | |
|---|---|---|
| CA | 2 235 566 A1 | 8/1999 |
| JP | 11-086184 | 3/1999 |
| JP | 2000-048300 | 2/2000 |
| JP | 2001-118190 | 4/2001 |
| JP | 2002-230696 | 8/2002 |
| JP | 2002-260162 | 9/2002 |
| JP | 2002-269457 | 9/2002 |
| JP | 2002-304563 | 10/2002 |
| JP | 2002-358599 | 12/2002 |

(Continued)

*Primary Examiner*—Mark Hellner
(74) *Attorney, Agent, or Firm*—Dickstein, Shapiro, LLP.

(57) ABSTRACT

A vehicle information collection system is disclosed for receiving vehicle information by way of a communication network and storing the vehicle information. The vehicle information collection system comprises: a vehicle information collection device for collecting the vehicle information of a plurality of vehicles from each vehicle by way of the communication network; and a point-issuing device that is connected to the vehicle information collection device by way of the communication network for conferring points to the vehicles according to the vehicle information. The vehicle information management unit collects and stores vehicle information at any time, and when a prescribed condition has been met, transmits vehicle information that has been stored and information indicating its own vehicle to the vehicle information collection device by way of the on-board communication unit and the network. The vehicle information collection device, upon receiving vehicle information from a vehicle, both classifies and stores the received information and transmits the information that indicates the vehicle and the vehicle information that has been received from the vehicle to a point-issuing device by way of the network. The point-issuing device, upon receiving these items of information, issues points in a number that corresponds to the amount and/or the category and/or the value of vehicle information and transmits to the vehicle information that indicates the number of issued points.

4 Claims, 14 Drawing Sheets

FOREIGN PATENT DOCUMENTS

| | | | |
|---|---|---|---|
| JP | 2003-044988 | | 2/2003 |
| JP | 2003-203296 | | 7/2003 |
| JP | 2003-248898 | | 9/2003 |
| JP | 2003-279358 | | 10/2003 |
| JP | 2003-281674 | | 10/2003 |
| WO | WO-00/22594 | A1 | 4/2000 |

* cited by examiner

Fig. 7A

| vehicle information | point |
|---|---|
| speed | 100 |
| position of travel | 100 |
| direction of travel | 30 |
| ⋮ | ⋮ |
| windshield wiper | 30 |
| turning signal lamp | 20 |
| ⋮ | ⋮ |
| battery charge level | 10 |
| tire pressure | 10 |
| ⋮ | ⋮ |
| vehicle type | 10 |
| model year | 10 |
| displacement | 10 |
| ⋮ | ⋮ |

Fig. 7B

| service | point |
|---|---|
| destination vicinity service | 1000 |
| road traffic information (1 hour) | 1000 |
| weather information | 200 |
| ⋮ | ⋮ |

VEHICLE INFORMATION COLLECTION SYSTEM HAVING POINT ISSUING DEVICE

BACKGROUND OF THE INVENTION

1. Field of the Invention

The present invention relates to a vehicle information collection system for collecting vehicle information such as travel position and vehicle speed from a vehicle by way of a communication network.

2. Description of the Related Art

A road traffic information providing system has been proposed in, for example, JP-A-2000-48300 and JP-A-2001-118190 that produces road traffic information and provides the road traffic information to drivers of vehicles using information that has been transmitted though radio communication from vehicles that are traveling on roads.

To improve the accuracy of the road traffic information, information must be collected from a large number of vehicles. Systems have been realized in taxi companies and transport companies to receive various types of information during vehicle travel by way of radio transmission lines from vehicles for business use that belong to the companies, and then implement dynamic management over the vehicles for business use (management of travel positions and management of, for example, the presence or absence of freight or passengers). It is conceivable to use such a system to collect from each vehicle information that would be useful for producing, for example, road traffic information. However, in a system for implementing dynamic management of vehicles, there is a limitation in the number of vehicles and the range of travel of the vehicles, making it difficult to collect information in sufficient quantity to raise the accuracy of road traffic information.

In order to cope with this problem, a road traffic information providing system has been proposed in, for example, JP-A-2003-203296 that in order to collect information from a large number of vehicles, adopts an arrangement wherein points that are equivalent to a monetary value are granted to individuals who have provided vehicle information by way of vehicles.

However, although the on-board device in the road traffic information providing system described in JP-A-2003-203296 is capable of displaying accumulated points, it is unable to receive the on-line services that are provided based on accumulated points (refer to paragraph 0011 of JP-A-2003-203296). Accordingly, for users such as the drivers of vehicles, the points are difficult to use and the advantages derived from using the points have not been utilized. As a result, these points do not contribute greatly toward the efficient collection of vehicle information. In addition, in the road traffic information providing system that is described in JP-A-2003-203296, the road traffic center that provides the road traffic information issues the points. In other words, the points are used for nothing more than the collection of information for preparing road traffic information.

SUMMARY OF THE INVENTION

It is an object of the present invention to provide a vehicle information collection system and on-board device that, in a system that adopts the arrangement of granting points for providing vehicle information, is capable of not only utilizing the points more effectively and facilitating the collection of vehicle information, but of collecting a wide range of vehicle information.

According to one aspect of the present invention, there is provided a vehicle information collection system comprising:

a vehicle information collection device for collecting vehicle information from vehicles by way of a communication network;

a point-issuing device connected to the vehicle information collection device by way of the communication network for conferring points to the vehicles in accordance with vehicle information; and an on-board device including a vehicle information management means for collecting vehicle information, and an on-board communication means for transmitting vehicle information that has been collected by the vehicle information management means to the vehicle information collection device by way of the communication network.

The points are issued by a point-issuing device that is separated from the vehicle information collection device, thereby enabling more effective utilization of the points, easier collection of vehicle information, and further, collection of a broad range of vehicle information.

According to an embodiment of the present invention, the point-issuing device includes: a communication means for receiving indication by way of the communication network that the vehicle information collection device has received vehicle information from a vehicle; and a point-issuing means for conferring points to that vehicle according to the amount and/or the category and/or the value of vehicle information that has been received by way of the communication means.

According to an embodiment of the present invention, the vehicle information collection device transmits to other devices that are connected by way of the communication network vehicle information of the categories that these other devices require. Accordingly, the vehicle information that has been collected by the vehicle information collection device can also be provided to devices that do not necessarily provide a service directly to users of vehicles.

According to an embodiment of the present invention, the vehicle information collection system further includes a service-providing device that is connected to vehicles by way of the communication network for providing a service according to the points that have been issued by the point-issuing device; and the on-board device further includes: a service utilization control means for instructing the use of a service according to the issued points, and a service utilization means for receiving service from the service-providing device according to the instructions from the service utilization control means. In this way, services such as the provision of road traffic information can be provided to drivers of vehicles or to vehicle owners.

According to an embodiment of the present invention, the on-board device further includes a point storage means for storing points; and the on-board communication means receives points from the point-issuing device by way of the communication network and supplies the received points to the point storage means. Each vehicle manages points, and the points are therefore easier to use.

According to an embodiment of the present invention, the point-issuing device further includes a point storage unit for storing points that have been issued for each vehicle or for each user. In this way, points can be used through the use of a terminal device other than the on-board device.

According to an embodiment of the present invention, a plurality of vehicle information collection devices are provided, and the on-board communication means transmits vehicle information that has been collected by the vehicle information management means to any vehicle information collection device among the plurality of vehicle information collection devices. The provision of a plurality of vehicle information collection centers facilitates the management of vehicle information that has been transmitted from a multiplicity of vehicles.

According to an embodiment of the present invention, a plurality of service-providing devices that provide different services are provided, and the service utilization control means designates any of the plurality of service-providing devices and instructs the utilization of a service. In this way, a user is able to receive a variety of provided services from the plurality of service-providing devices.

According to another aspect of the present invention, there is provided with an on-board device comprising:

vehicle information management means for collecting vehicle information;

on-board communication means for both transmitting vehicle information that has been collected by the vehicle information management means to the vehicle information collection device and receiving by way of the communication network information that indicates points from a point-issuing device that confers points according to information that has been provided by a vehicle;

point storage means for storing points that have been received by the on-board communication means; and service utilization means for transmitting, to a service-providing device that provides a service according to points by way of the communication network, a request to provide a service according to points that have been stored in the point storage means.

According to another embodiment of the present invention, the on-board device includes a service utilization control means for designating categories of service; and the service utilization control means transmits a request to provide a service to, among the plurality of service-providing devices that each provide various services according to points, a service-providing device that provides a service of a category that has been designated by the service utilization control means.

The above and other objects, features, and advantages of the present invention will become apparent from the following description with reference to the accompanying drawings, which illustrate examples of the present invention.

BRIEF DESCRIPTION OF THE DRAWINGS

FIG. 7 shows the relations between points and vehicle information, and points and service;

DETAILED DESCRIPTION OF THE PREFERRED EMBODIMENTS

First Embodiment

Figure 1:
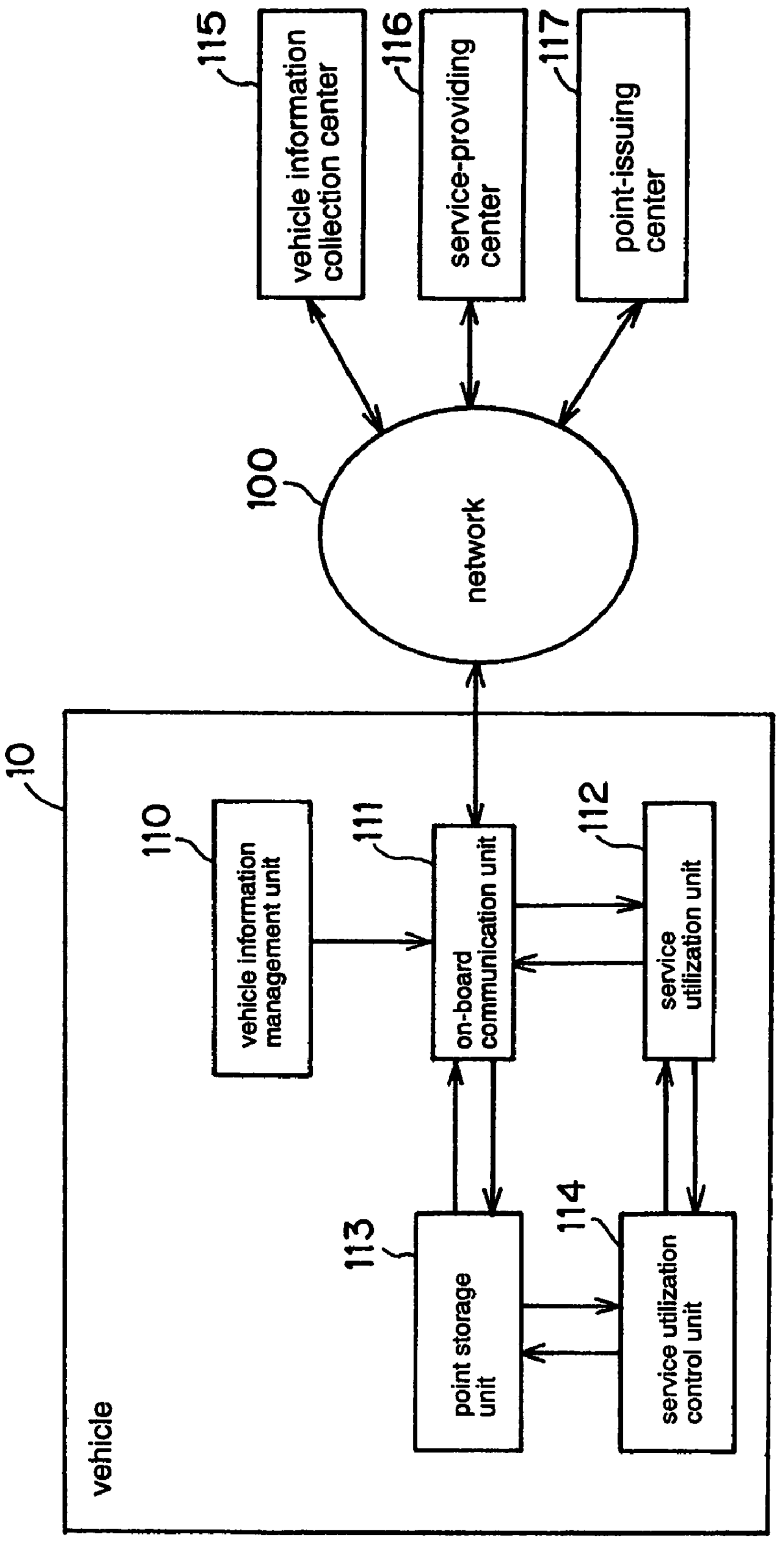
FIG. 1 is a block diagram of a vehicle information collection system according to a first embodiment of the present invention.

Referring now to FIG. 1, there is shown a vehicle information collection system according to a first embodiment of the present invention, comprising motor vehicle 10, vehicle information collection center 115, service-providing center 116, and point-issuing center 117, these components being connected to each other by way of communication network 100 that is, for example, the Internet.

Vehicle 10 includes vehicle information management unit 110, on-board communication unit 111, service utilization unit 112, point storage unit 113, and service utilization control unit 114. Vehicle information management unit 110 collects and stores vehicle information such as the travel position and speed of vehicle 10 when vehicle 10 is traveling on a road. On-board communication unit 111 transmits vehicle information that has been collected to vehicle information collection center 115 by way of communication network 100; and receives, as a service, information from service-providing center 116 and point information from point-issuing center 117. Service utilization unit 112 uses services that are provided from service-providing center 116. Point storage unit 113 accumulates points that have been issued by point-issuing center 117. Service utilization control unit 114 performs requests that conform to conditions when using a service.

Vehicle information management unit 110, on-board communication unit 111, service utilization unit 112, point storage unit 113, and service utilization control unit 114 maybe realized as, for example, the constituent elements of one on-board device. An on-board device may be a device that is dedicated to implementing the present invention, or may be a device that operates in concert with an existing vehicle device such as a car navigation device. Alternatively, vehicle information management unit 110, on-board communication unit 111, service utilization unit 112, point storage unit 113, and service utilization control unit 114 may be incorporated into an existing on-board device such as a car navigation device.

Typically, the on-board device incorporates a central processing unit (CPU) that executes control in accordance with a built-in program and a storage device such as RAM or a hard disk. Vehicle information management unit 110 is realized by the CPU that executes control in accordance with a program, and point storage unit 113 is realized by a storage device. Service utilization control unit 114 is realized by a CPU that executes control in accordance with a program. When a car navigation device is mounted in the vehicle, service utilization unit 112 corresponds to this car navigation device. In such a case, the service that is provided by service-providing center 116 may be, for example, road traffic information such as congestion information or information relating to the destination or the area in which the vehicle is traveling (for example, parking vacancy information or dining information). However, the services that are provided by service-providing center 116 are not limited to these services. In addition, service utilization unit 112 is not limited to a car navigation device, and may be a dedicated display device for displaying information as a service.

The on-board device can be connected to communication network 100 such as the Internet via a communication means such as packet communication of a portable telephone, PHS (Personal Handyphone System) communication, DSRC (Dedicated Short Range Communication), wireless LAN (Local Area Network), or satellite communication. On-board communication unit 111 both realizes the hardware interface (including an antenna) of one or a plurality of these communication means and executes communication protocol. More specifically, on-board communication unit 111 includes an antenna and communication LSI.

Vehicle information management unit 110 receives as input: vehicle information from sensors that are installed in vehicle 10, vehicle information by communicating with an on-board MPU for controlling components that are mounted in the vehicle, and vehicle information from a car navigation device (for example, traveling position information). The collected vehicle information includes, for example: the charged level of the battery, air pressure of the tires, engine oil level, level of the fuel tank, state of use of seat belts, vehicle speed, vehicle travel position, vehicle direction, distance traveled by the vehicle, state of operation of the windshield wipers, and state of the turn signals. This vehicle information is stated by way of example, and any other information that can be collected from a vehicle can be included in the vehicle information.

Figure 2:
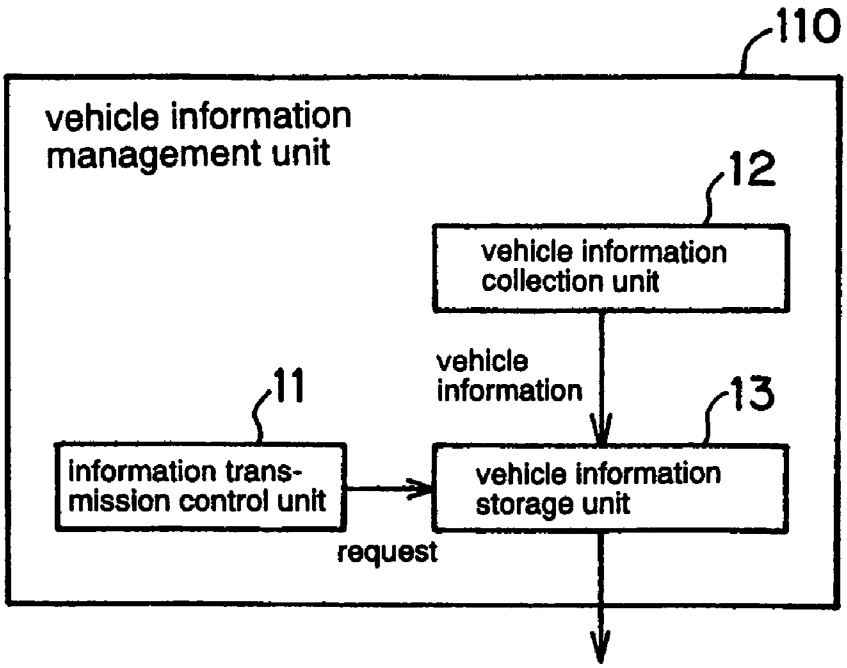
FIG. 2 is a block diagram showing an example of the configuration of the vehicle information management unit.
Figure 3:
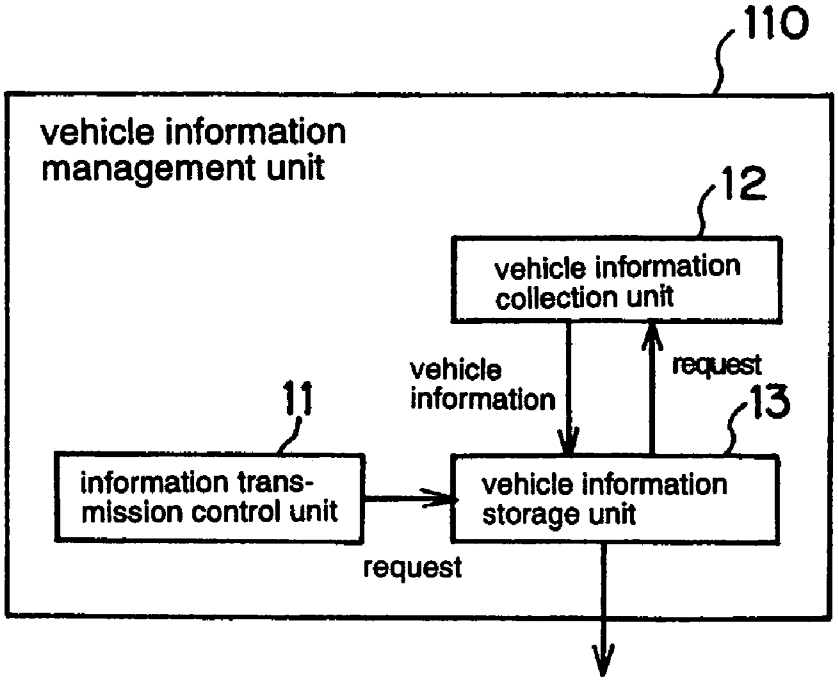
FIG. 3 is a block diagram showing another example of the configuration of the vehicle information management unit.
Figure 4:
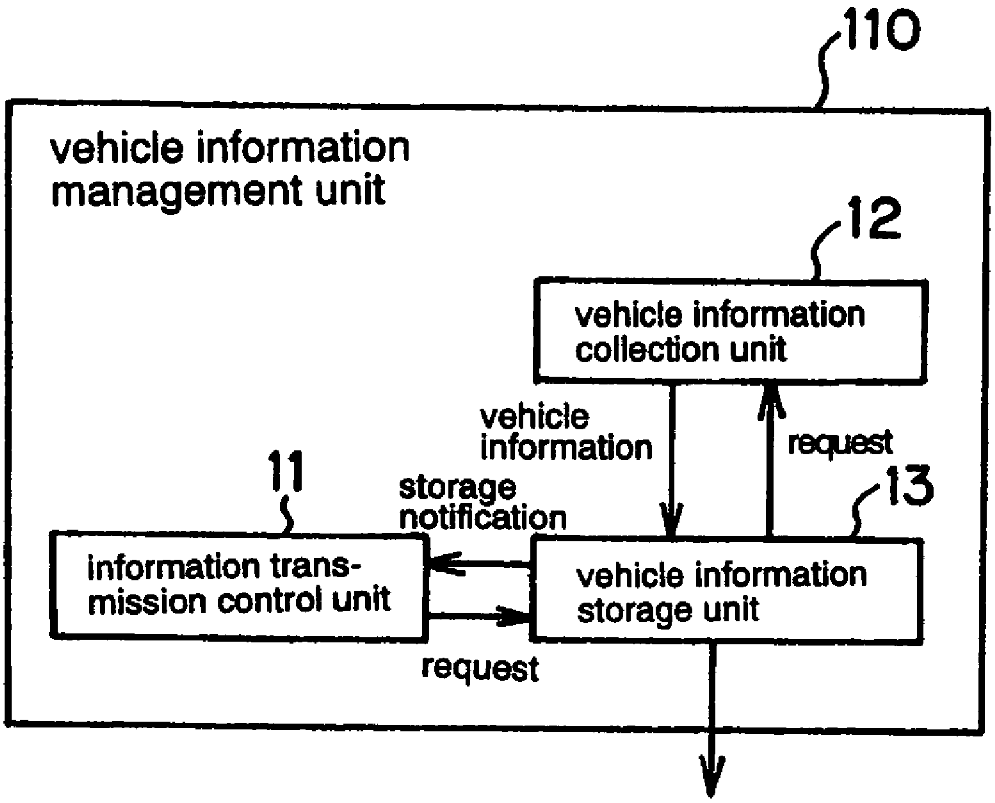
FIG. 4 is a block diagram showing yet another example of the configuration of the vehicle information management unit.

FIGS. 2-4 are block diagrams showing examples of the configuration of vehicle information management unit 110. As shown in FIGS. 2-4, vehicle information management unit 110 includes: information transmission control unit 11, vehicle information collection unit 12, and vehicle information storage unit 13.

In the example shown in FIG. 2, vehicle information collection unit 12 receives vehicle information at any time, for example, at prescribed time intervals, and stores the vehicle information on-board information storage unit 13. Information transmission control unit 11 causes vehicle information storage unit 13 to output the stored vehicle information to on-board communication unit 110 when prescribed conditions have been satisfied. Such prescribed conditions may include the passage of a time interval that has been determined in advance, travel of a distance that has been determined in advance, or the surpassing of a prescribed amount of stored information that has been determined in advance, or the operation by the user. Alternatively, vehicle information management unit 110 may be designed to transmit vehicle information with each input of new vehicle information.

In the example shown in FIG. 3, after the passage of a time interval that has been determined in advance, information transmission control unit 11 instructs vehicle information storage unit 13 to collect and store vehicle information. Vehicle information storage unit 13 issues a request to collect of vehicle information to vehicle information collection unit 12 in accordance with the instructions. Vehicle information collection unit 12, in accordance with the collection request, collects vehicle information by receiving information from the on-board sensors, communicating with the on-board MPU, and receiving information from the car navigation device that incorporates GPS functions, and supplies the collected vehicle information to vehicle information storage unit 13. Vehicle information storage unit 13, while temporarily storing the vehicle information, supplies the received vehicle information to on-board communication unit 111.

In the example shown in FIG. 4, vehicle information storage unit 13 issues a request to collect vehicle information to vehicle information collection unit 12 when, for example, a predetermined time interval has elapsed. In accordance with the collection request, vehicle information collection unit 12 collects vehicle information by receiving information from the on-board sensors and communicating with the on-board MPU, and supplies the collected vehicle information to vehicle information storage unit 13. Vehicle information storage unit 13 stores the vehicle information that has been received. When the stored amount reaches a prescribed amount, vehicle information storage unit 13 issues a vehicle information storage notification to information transmission control unit 11. In response to this vehicle information storage notification, information transmission control unit 11 causes information storage unit 13 to output the stored vehicle information to on-board communication unit 111.

Figure 5:
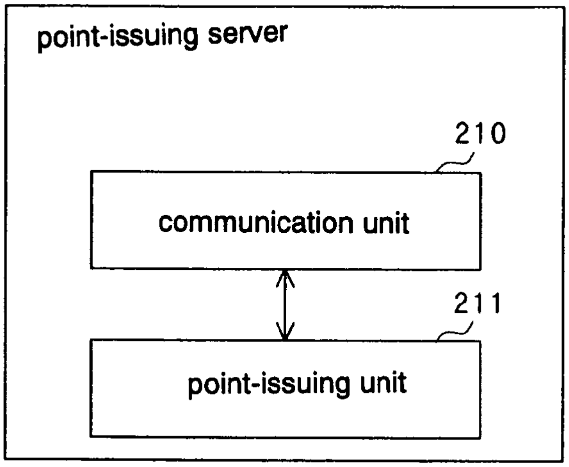
FIG. 5 is a block diagram showing an example of the configuration of the point-issuing server.

A vehicle information collection server (not shown), which is a vehicle information collection device that collects vehicle information and that can be connected to network 100 such as the Internet, is established on-board information collection center 115. In addition, a service-providing server (not shown), which is a service-providing device for providing services and which can be connected to network 100, is established in service-providing center 116. Further, a point-issuing server (not shown), which is a point-issuing device for issuing points and which can be connected to network 100, is established in point-issuing center 117. As shown in FIG. 5, the point-issuing server includes: communication unit 210 for receiving notification by way of network 100 that vehicle information collection center 115 has received vehicle information from vehicle 10; and point-issuing unit 211 for conferring points in accordance with the amount and/or the category and/or the value of vehicle information that has been received by way of communication unit 210. The term "value" of vehicle information herein refers to the accuracy, reliability, and scarcity thereof. For example, information from a position detection device with high accuracy is considered to be more valuable than information from a position detection device with low accuracy, and more points are conferred on it. Information from a vehicle running on a road with no other vehicle running is considered to be valuable because of its scarcity, and more points are conferred on it. Information from a vehicle quite different from information from its neighboring vehicles is considered to be unreliable and less valuable, and less or no points are conferred on it. Information that other persons desire is considered to be valuable, and more points are conferred on it.

Services that are provided by service-providing center 116 can include, for example: a service for providing road traffic information, a service for providing estimated travel times; a service for providing weather information such as information on rain, a service for providing information on road surface conditions, a service for providing information on vehicle operating conditions and breakdown conditions, and a service for providing information that relates to common daily necessities such as information on restaurants and other businesses, leisure facilities, and events. These services are only examples, and a wide variety of other services can also be provided.

Figure 6:
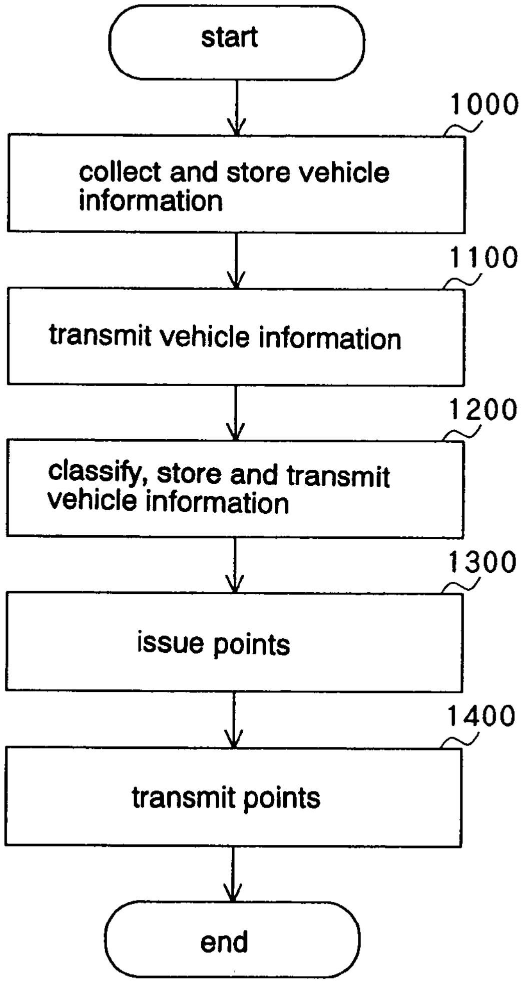
FIG. 6 is a flow chart showing the operations of the system up to the storage of points that have been issued based on vehicle information in the first embodiment.
Figure 9:
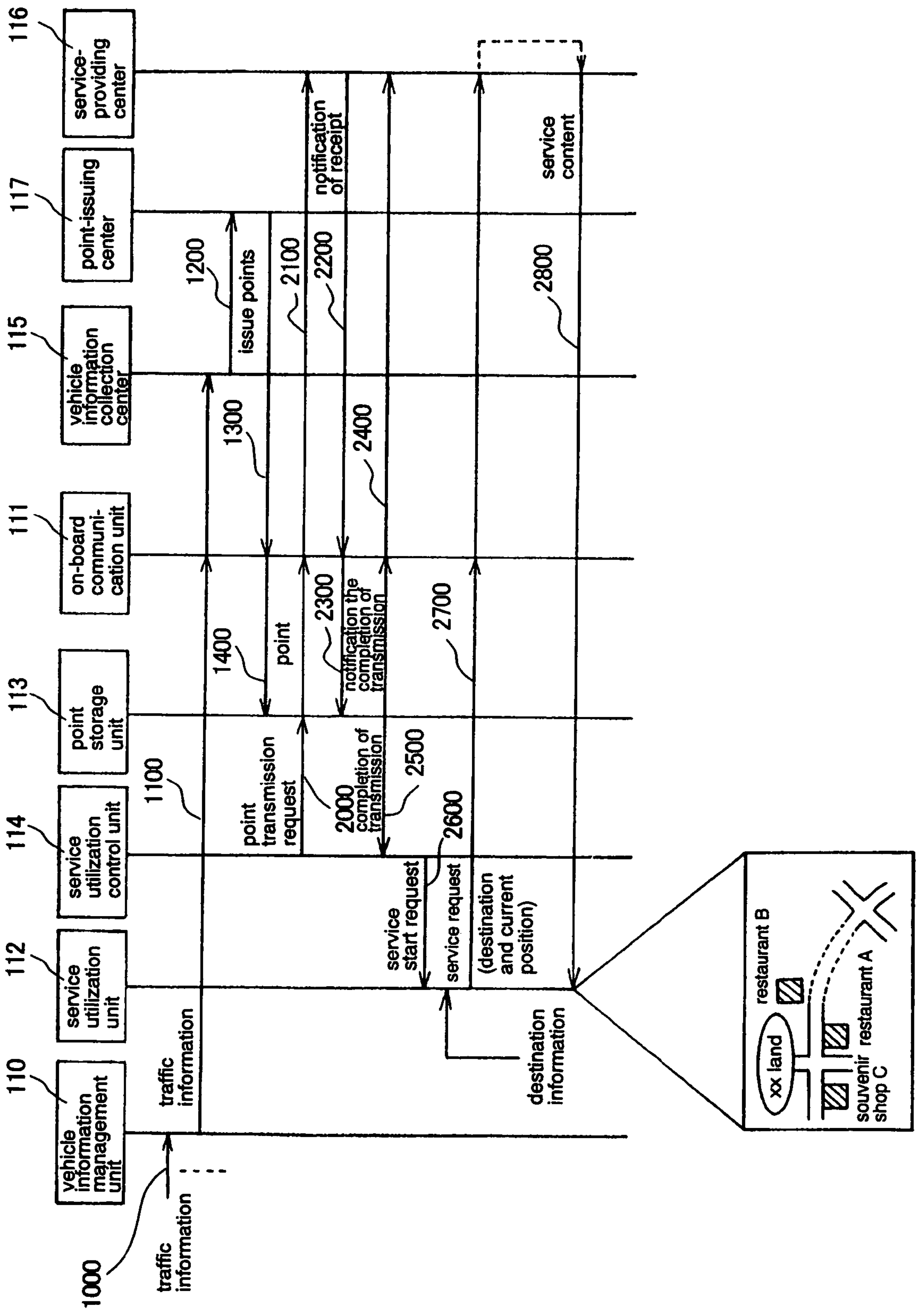
FIG. 9 is a sequence chart of an example of the process of storing points and the process of receiving a provided service in the first embodiment.

FIG. 6 is a flow chart showing the operations of the system up to the storage, in point storage unit 113 of vehicle 10, of points that are issued based on vehicle information. In addition, FIG. 9 is a sequence chart showing an example of the process of storing points and an example of the process for receiving a provided service.

In Step 1000, vehicle information management unit 110 first collects and stores vehicle information at any time. Then, when a prescribed condition has been satisfied, vehicle information management unit 110 transmits the vehicle information that has been stored and information that indicates its own vehicle to vehicle information collection center 115 by way of on-board communication unit 111 and network 100 in Step 1100.

In Step 1200, upon receiving vehicle information from vehicle 10, vehicle information collection center 115 both classifies and stores the information that has been received and transmits information that indicates vehicle 10 and the vehicle information that has been received from vehicle 10 to point-issuing center 117 by way of network 100.

In Step 1300, upon receiving these items of information, point-issuing center 117 issues a number of points (see FIG. 7A) according to the amount and/or the category and/or the value of vehicle information. Point-issuing center 117 then transmits to vehicle 10 information indicating the number of points that have been issued. On-board communication unit 111 of vehicle 10 may multicast the same vehicle information to both vehicle information collection center 115 and point-issuing center 117.

In vehicle 10, upon receiving the information that indicates the number of points, on-board communication unit 111 transmits the number of points to point storage unit 113 in Step 1400, and point storage unit 113 adds the received number of points to the number of points that have already been stored.

FIG. 7A shows an example of the relation between the points that have been issued by point-issuing center 117 and the vehicle information. In the example shown in FIG. 7A, point-issuing center 117, upon learning that vehicle information collection center 115 has acquired the vehicle information that is noted in the left column of FIG. 7A, grants the corresponding points (the points that are noted in the right column of FIG. 7A) to the vehicle that provided the vehicle information. The points may be conferred by vehicle, or may be conferred by individual (user). When the points are to be conferred by user, information that specifies the user is transmitted when vehicle information is transmitted from vehicle 10. In such a case, the on-board device is provided with an ID card reader into which the user inserts his or her own ID card. Then, for example, vehicle information management unit 110 recognizes the user by means of the ID card reader. Alternatively, set vehicle information such as the vehicle type, year, and displacement (information that is not collected by sensors) is set in advance on-board information management unit 110 on-board 10.

FIG. 7B shows an example of the relation between services that are provided by service-providing center 116 and points. In the example shown in FIG. 7B, service-providing center 116 provides the services that are noted in the left column of FIG. 7B in accordance with the number of points that is noted in the right column of FIG. 7B.

Figure 8:
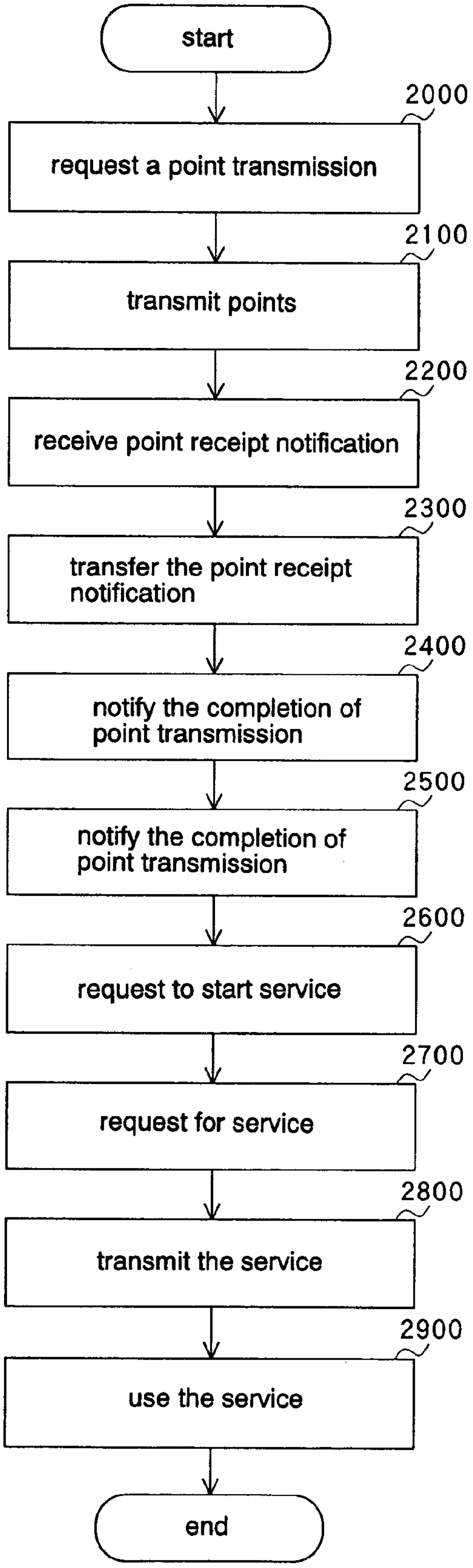
FIG. 8 is a flow chart showing the process for receiving a service that is provided according to points that have been stored in the first embodiment.

FIG. 8 is a flow chart showing the process of receiving a service that is provided according to points that have been stored in point storage unit 113. When a user wishes to receive a service that is provided based on points, service utilization control unit 114 issues a point transmission request to point storage unit 113 to request the transmission of points to service-providing center 115 in Step 2000, as shown in FIGS. 8 and 9. In accordance with the transmission request, point storage unit 113 transmits points to service-providing center 116 by way of on-board communication unit 111 and network 100 in Step 2100. If service utilization control unit 114 has not instructed the number of points, point storage unit 113 transmits all of the points that are stored.

In Step 2200, service-providing center 116 receives the points, stores the points that have been received together with information that indicates the sender, and transmits notification of receipt of the points to vehicle 10 by way of network 100. On-board 10, upon receiving the point receipt notification, on-board communication unit 111 transfers the received point receipt notification to point storage unit 113 in Step 2300. Point storage unit 113, having received the point receipt notification, transmits notification of the completion of point transmission to service-providing center 116 by way of on-board communication unit 111 and network 100 in Step 2400. At this time, point storage unit 113 subtracts the number of points that have been transmitted to service-providing center 116 from the number of points that are stored. Point storage unit 113 further notifies service utilization control unit 114 in Step 2500 that the transmission of points to service-providing center 116 has been completed.

At this stage, vehicle 10 has completed preparations for receiving a service from service-providing center 116, and service utilization control unit 114 therefore issues a request to start service to service utilization unit 112 in Step 2600. The request to start service includes, for example, information specifying the service according to designation by the user. In Step 2700, service utilization unit 112 transmits the request for service to service-providing center 116 by way of on-board communication unit 111 and network 100. In accordance with the request for service, service-providing center 116 transmits the service content to vehicle 10 by way of network 100 in Step 2800. On-board 10, service utilization unit 112 receives the service content by way of on-board communication unit 111 and uses the received content in Step 2900.

As an example of a service, FIG. 9 shows a case of using a destination vicinity guide service. In this case, service utilization unit 112 receives as input from the user information that indicates the destination and therefore includes information indicating the destination in the service start request that is transmitted to service-providing center 116. Based on the information that indicates the destination, service-providing center 116 searches a map database that it holds and acquires information (such as names, locations, positions, and telephone numbers) of restaurants in the vicinity of the destination. Service-providing center 116 then transmits these items of information to vehicle 10 as the service content. In this example, service utilization unit 112 includes a display device and display control device. Then, upon receiving the information on restaurants in the vicinity of the destination from service-providing center 116, service utilization unit 112 displays this information on the display device. When provided with map information, service utilization unit 12 can perform display in a form in which the restaurants are superposed on the map as shown in FIG. 9.

The services that can be provided to a vehicle are not limited to the destination vicinity guide service. For example, when road traffic information is provided as the service, service-providing center 116 transmits, at prescribed time intervals, road traffic information such as congestion information to vehicle 10 according to the route of vehicle 10 for a time interval that depends on the number of points that have been transmitted from vehicle 10. In such a case, vehicle 10 transmits its own position as needed to service-providing center 116.

Vehicle information management unit 110 does not necessarily transmit all of the categories of collected vehicle information to vehicle information collection center 115, and may transmit only one or more categories of vehicle information that have been designated by the user in advance. Such an arrangement can prevent the divulgement of vehicle information that the user does not wish to send.

Vehicle information collection center 115 receives vehicle information from a multiplicity of vehicles 10. Vehicle information that has been received by vehicle information collection center 115 is classified and stored, and information that is stored is information that has been received from the multiplicity of vehicles 10. The vehicle information is further classified in vehicle information collection center 115 according to, for example, routes, current positions, vehicle types, and users. One item of vehicle information may be classified among a plurality of categories (such as vehicle type category and a user type category).

Information that has been categorized in this way is not only used in a road traffic information providing center as service-providing center 116, but is also used in a facility that is not service-providing center 116. For example, when the server of a roads administration agency (seen as another device from the server of vehicle information collection center 115) is connected by way of a network to vehicle information collection center 115, this server receives turn-signal information by way of network 100 from the server of vehicle information collection center 115 (vehicle information collection server), detects that right and left turns are frequent at a specific intersection, and based on these detection results, is able to more effectively utilize road maintenance (for example, by lengthening the time of signal display permitting right turns). Alternatively, when a server that is operated by a company that provides weather information is connected to the vehicle information collection server by way of a network, the server of the company that provides weather information can receive windshield wiper information from the vehicle information collection server and utilize this received information in weather information.

When the server of an automobile manufacturer is connected to the vehicle information collection server by way of a network, the server of the automobile manufacturer can receive from the vehicle information collection server vehicle information regarding vehicles of its own manufacture (vehicle information that relates to inspection points that is collected by vehicle information management unit 110 by way of on-board sensors and the on-board MPU), and based on this received information, determine, for example, the degree of change over time for each vehicle type. By obtaining information on the degree of change over time, the automobile manufacturer, can use this obtained information as feedback in the development of new models.

When the server of an automobile repair company is connected to the vehicle information collection server by way of a network, various vehicle information relating to the wear and tear on an automobile, such as battery charge level or tire pressure can be received from the vehicle information collection server and then utilized in a repair notification service. In other words, the owner of each vehicle (specified by, for example, vehicle ID) can be advised regarding inspection intervals or inspection items.

Accordingly, the vehicle information collection server incorporates: a communication unit (that includes hardware for communication line connections and software for executing communication protocol) for communicating with an on-board device or other servers by way of network 100, and, in addition to programs for both collecting vehicle information by way of the communication unit and classifying vehicle information that has been collected and storing the information in a storage unit, programs for extracting vehicle information that is necessary to other servers from the storage unit and transmitting this vehicle information by way of a communication unit to these servers.

Thus, in the present embodiment, vehicle information that has been collected by vehicle information collection center 115 is not only used for generating services that are offered to users, but is also utilized for generating information that does not relate to the services that are offered to users.

The server (point-issuing server) that is established in point-issuing center 117 is configured to include at least: a communication unit (that includes hardware for communication line connections and software for executing communication protocol) for receiving, by way of the communication network, notification that the vehicle information collection server has received vehicle information from a vehicle; and a program (point-issuing unit) for conferring points in accordance with the amount and/or the category and/or the value of vehicle information that has been received by way of the communication unit.

When each of the above-described servers for entities such as a roads administration agency is connected to the vehicle information collection server, the vehicle information collection server may be programmed to automatically transmit to each server only the categories of information that each server (including service-providing server 116) requires in advance. Alternatively, the vehicle information collection server may be programmed such that vehicle information is automatically transmitted to each server at time intervals that have been determined in advance. In this case, when the timing arrives for transmitting vehicle information to each server for entities such as a roads administration agency, the vehicle information collection server, in accordance with the program, extracts the categories of vehicle information that the server requires from the storage unit that stores the vehicle information and transmits the extracted vehicle information to the server. In this case, the time intervals at which the vehicle information collection server transmits vehicle information to each server may differ for each server. In this way, the vehicle information collection server can automatically transmit to each server vehicle information that is convenient to each respective server.

Finally, service-providing center 116 and point-issuing center 117 are provided independently of vehicle information collection server 115, and this configuration is advantageous for varying the services that are provided. In other words, such a configuration facilitates the modification or addition of services. When the number of points is modified according to the amount and/or the category and/or the value of the vehicle information, maintenance can be executed independently of vehicle information collection center 115.

Second Embodiment

Figure 10:
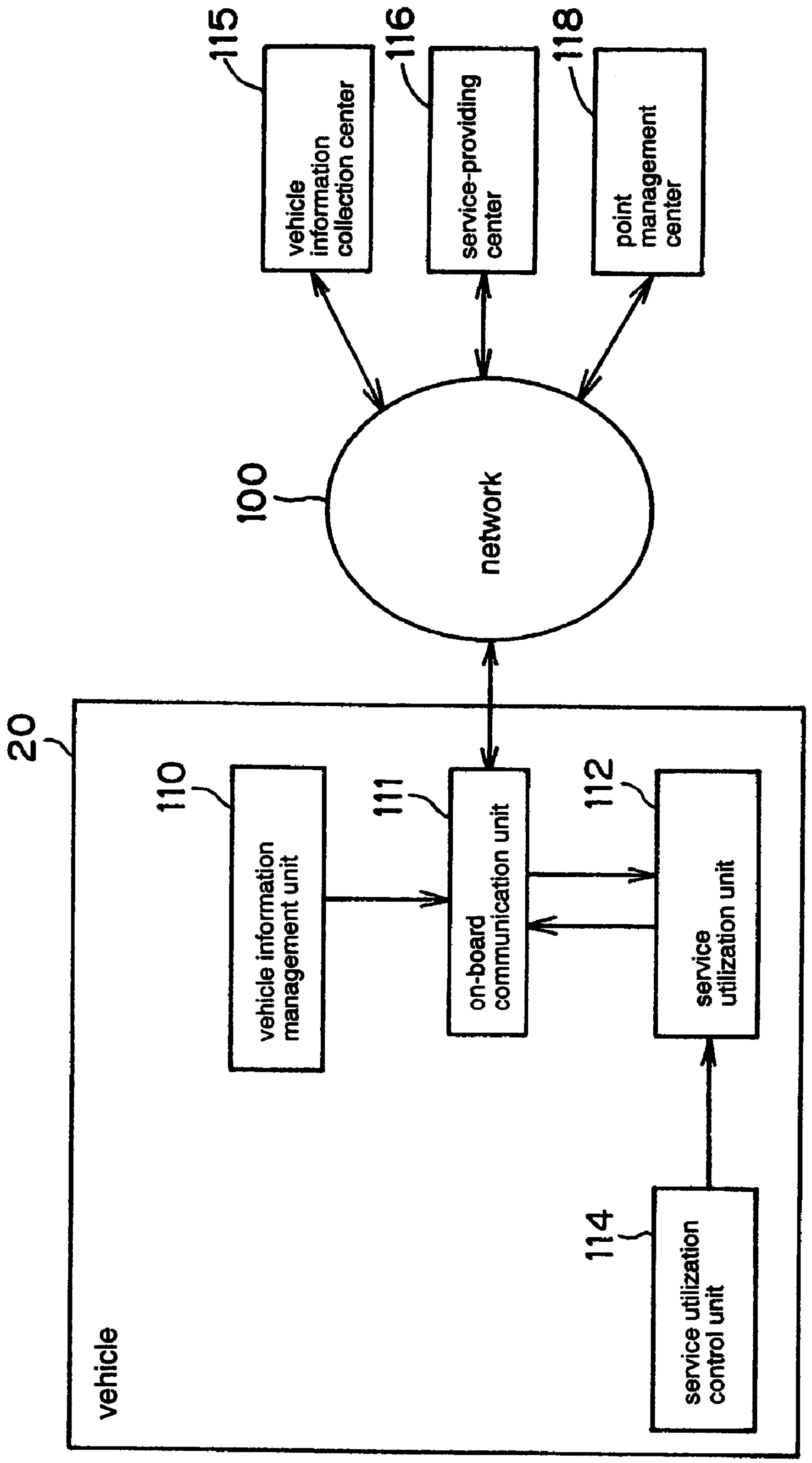
FIG. 10 is a block diagram showing the vehicle information collection system according to a second embodiment of the present invention.

FIG. 10 shows a vehicle information collection system according to the second embodiment of the present invention. Although vehicles 10 accumulated and stored points in the first embodiment, in the present embodiment, issued points are accumulated in point-managing center 118.

As shown in FIG. 10, vehicle 20 includes: vehicle information management unit 110 for collecting and storing vehicle information; on-board communication unit 111 for both transmitting vehicle information to vehicle information collection center 115 by way of network 100 and receiving information from service-providing center 116 as a service; service utilization unit 112 for utilizing the service that has been provided from service-providing center 116; and service utilization control unit 114 for performing requests that conform to conditions when using a service.

In the present embodiment, point-managing center 118 is provided in place of point-issuing center 117 in the first embodiment. A point-managing server that can connect to network 100 is established in point-managing center 118. In addition to the functions of point-issuing center 117 in the first embodiment, point-managing center 118 is provided with the function to manage points for each vehicle or points for each user.

Figure 11:
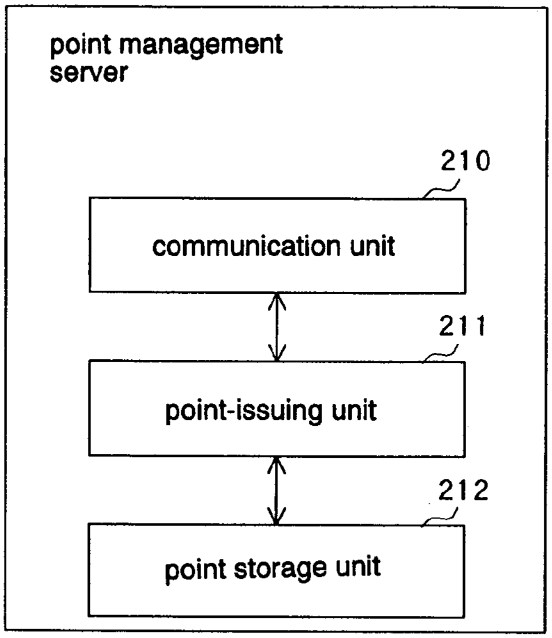
FIG. 11 is a block diagram showing an example of the configuration of the point management server.

As shown in FIG. 11, the point-managing server includes: communication unit 210 for receiving by way of network 100 notification that vehicle information collection center 115 has received vehicle information from vehicle 20; point-issuing unit 211 for granting points according to the amount and/or the category and/or the value of vehicle information that has been received by way of communication unit 210; and point storage unit 212 for storing points.

Figure 12:
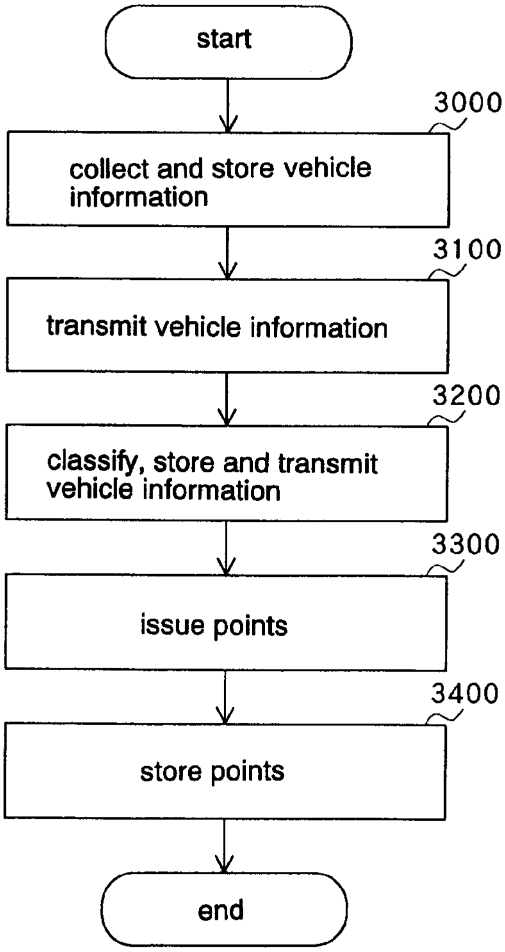
FIG. 12 is a flow chart showing the operation of the system up to the storage of points that are issued based on vehicle information in the second embodiment.
Figure 14:
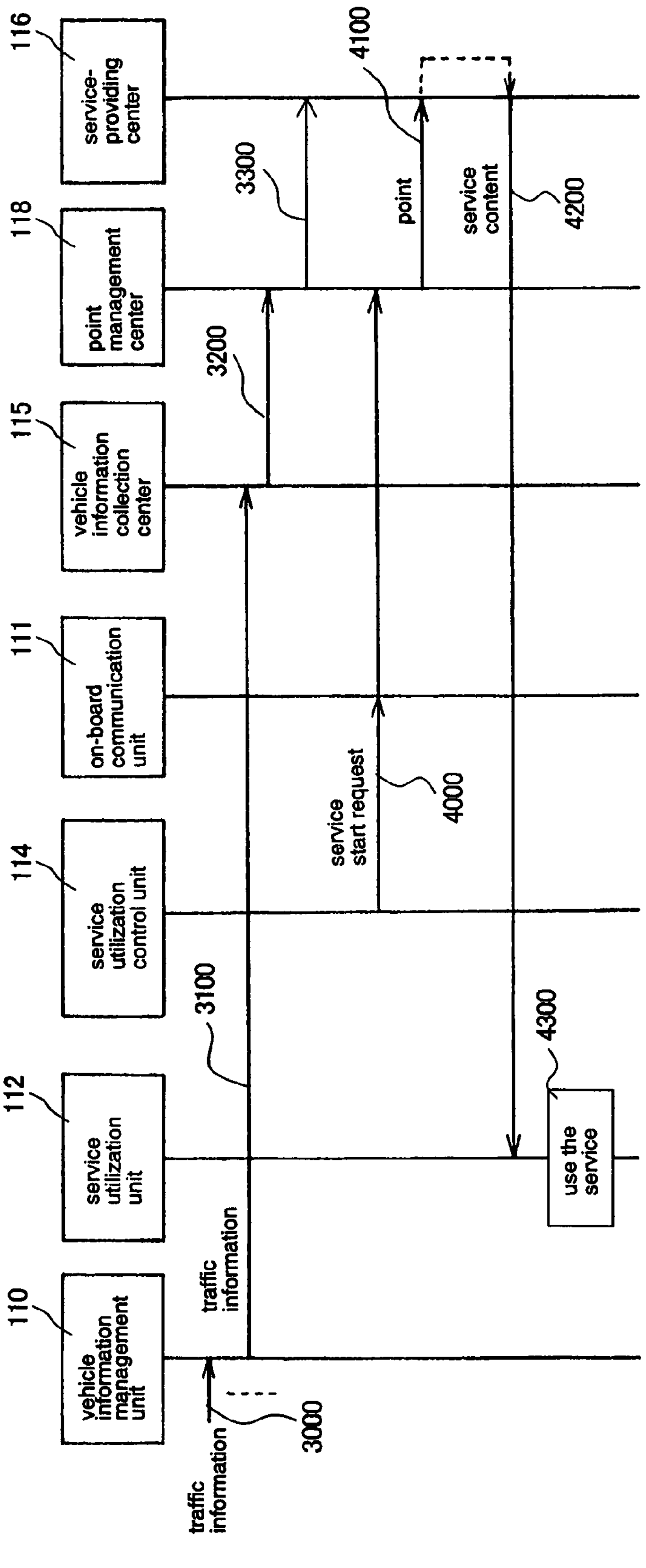
FIG. 14 is a sequence chart showing an example of the process of storing points and the process of receiving a service that is provided in the second embodiment.

FIG. 12 is a flow chart showing the operations of the system up to the step in which points that are issued based on vehicle information are stored in a vehicle. FIG. 14 shows sequence charts showing examples of the process of storing points and the process of receiving the provided service.

First, in Step 3000, vehicle information management unit 110 collects and stores vehicle information at any time. Then, when a prescribed condition has been met, vehicle information management unit 110 transmits vehicle information that has been stored by way of on-board communication unit 111 and network 100 to vehicle information collection center 115 in Step 3100.

Vehicle information collection center 115, upon receiving vehicle information from vehicle 20, classifies and stores the received information, and further, transmits information that indicates vehicle 20 and the vehicle information that has been received from vehicle 20 to point-managing center 118 by way of network 100 in Step 3200. In Step 3300, point-managing center 118, having received these items of information, issues points (see FIG. 7A) in accordance with the amount and/or the category and/or the value of vehicle information, and in Step 3400, stores information that indicates the number of issued points either by vehicle or by user. On-board communication unit 111 of vehicle 20 may also simulcast vehicle information to vehicle information collection center 115 and point-managing center 118.

When point-managing center 118 manages points by vehicle, a vehicle ID is transmitted together with vehicle information from vehicle 20. When point-managing center 118 manages points by user, a user ID is transmitted together with vehicle information from vehicle 20.

Figure 13:
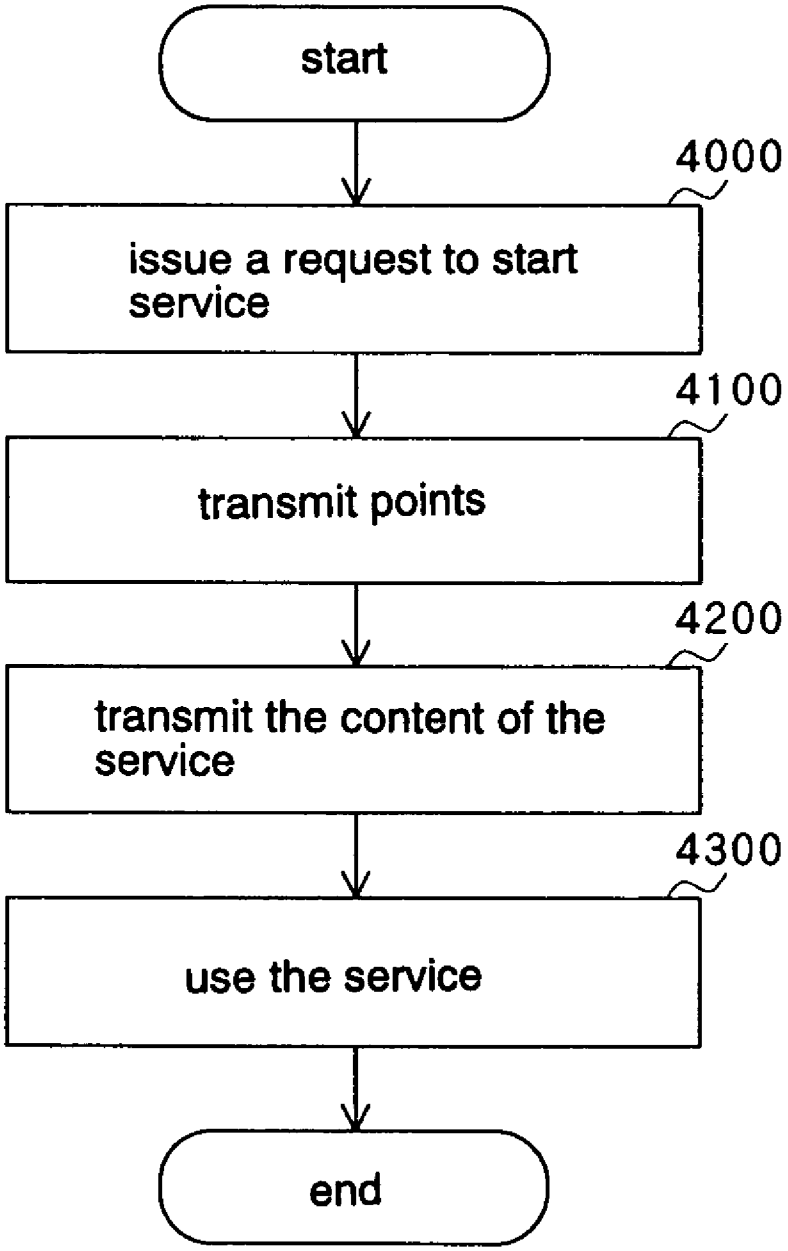
FIG. 13 is a flow chart showing the processes for receiving a service that is provided according to points that have been stored in the second embodiment.

FIG. 13 is a flow chart showing the process of receiving a service that is provided according to points that have been stored in point-managing center 118. When a user wishes to receive a service that is provided based on points, service utilization control unit 114 issues a request to start service to point-managing center 118 by way of on-board communication unit 111 and network 100 in Step 4000. The request to start service includes, for example, information specifying service that accords with the designation of the user. In Step 4100, point-managing center 118 transmits to service-providing center 116 the number of points for the service that the user wishes to receive. Point-managing center 118 hereupon subtracts from the number of accumulated points that have been conferred to the vehicle or user. In addition, service-providing center 116 receives from point-managing center 118 information specifying the service desired by the user.

In Step 4200, service-providing center 116 transmits the content of the service by way of network 100 to vehicle 20. In vehicle 20, service utilization unit 112 receives the content of the service as input by way of on-board communication unit 111 and uses the received content in Step 4300. The method of using the service is the same as in the first embodiment.

In the present embodiment, points of each vehicle or each user are managed as a group by point-managing center 118 instead of being stored in vehicle 20. As a result, a user is not only able to use vehicle 20 to receive a provided service, but is also able to use various terminal devices such as a personal computer that can connect to network 100 to receive a provided service. For example, a user is able to implement a method of use in which, before starting a journey, the user uses the personal computer in his or her own home to transmit a request to point-managing center 118 to begin service and thus receive, at his or her personal computer, information regarding businesses such as restaurants in the vicinity of the destination.

Third Embodiment

Figure 15:
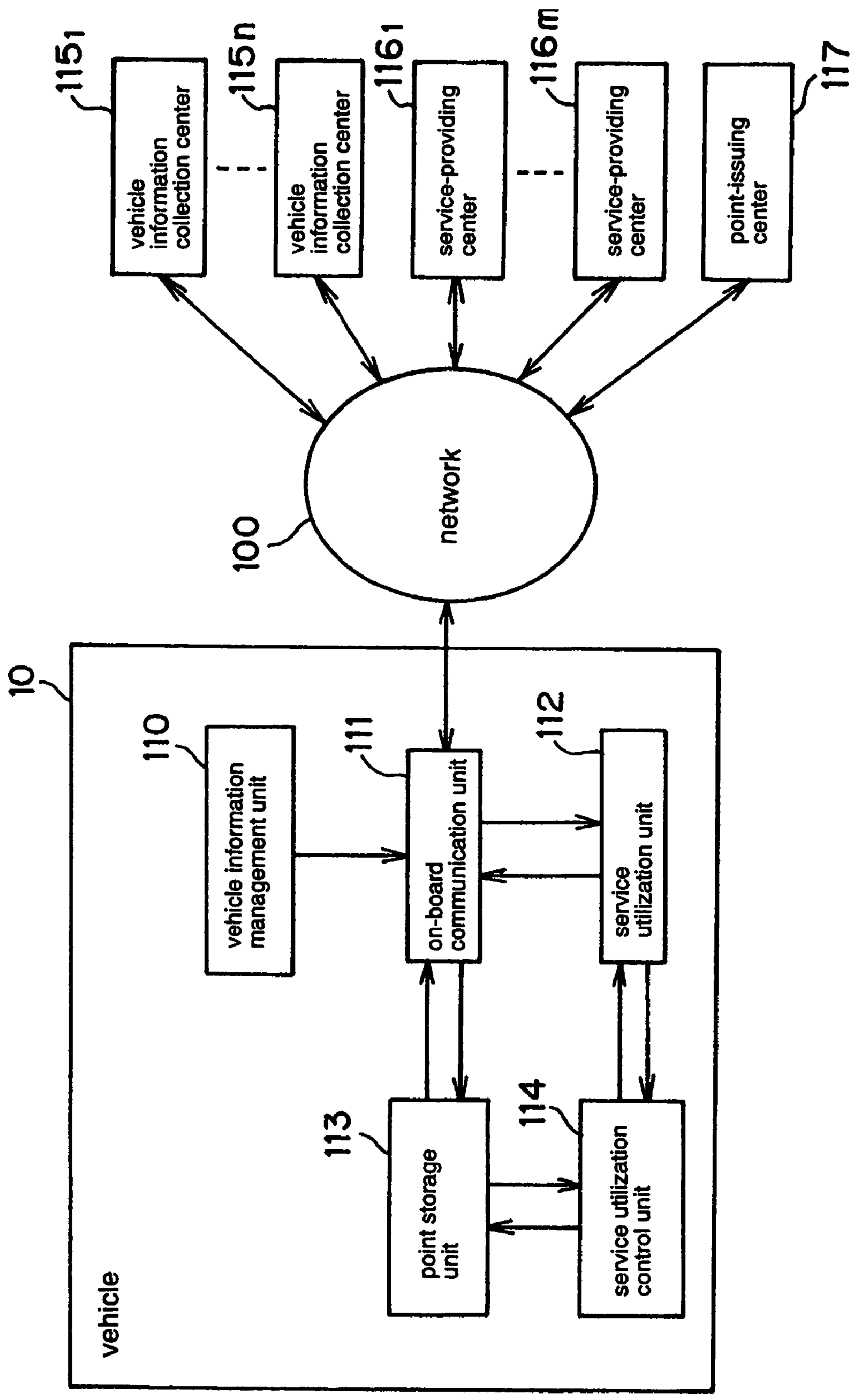
FIG. 15 is a block diagram showing the vehicle information collection system according to the third embodiment of the present invention.

FIG. 15 shows the vehicle information collection system according to the third embodiment of the present invention. In the present embodiment, a plurality of vehicle information collection centers $\mathbf{115}_1$-$\mathbf{115}_n$ and a plurality of service-providing centers $\mathbf{116}_1$-$\mathbf{116}_m$ are provided. Each of vehicle information collection centers $\mathbf{115}_1$-$\mathbf{115}_n$ collects vehicle information by, for example, category. Examples of these categories that can be considered include: a category relating to the travel of a vehicle (current position, speed, direction of travel, etc.); a category of information relating to the wear and tear on a vehicle; and a category relating to inspection items of a vehicle. One item of vehicle information may pertain to a plurality of categories. In addition, service-providing centers $\mathbf{116}_1$-$\mathbf{116}_m$ each provides services of different categories. Further, a plurality of centers among service-providing centers $\mathbf{116}_1$-$\mathbf{116}_m$ may provide the same service, or one service-providing center may provide services of a plurality of categories.

In the present embodiment, the configuration of on-board device that is mounted in vehicle 10 may be the same as the configuration in the first embodiment, and when transmitting vehicle information, vehicle information management unit 110 transmits vehicle information by way of on-board communication unit 111 and network 100 to the vehicle information collection center that corresponds to the category of vehicle information. When vehicle information is transmitted from vehicle 10, point-issuing center 117 issues points according to the amount and/or the category and/or the value of vehicle information as in the first embodiment.

When a service is used, service utilization control unit 114 gives instructions to point storage unit 113 to transmit points to the service-providing center that provides, for example, a service that accords with the designation of a user. According to the instructions, point storage unit 113 transmits points by way of on-board communication unit 111 and network 100 to the designated service-providing center. The service-providing center that has received the points transmits the content of the service to vehicle 10.

In the present embodiment, the provision of a plurality of vehicle information collection centers $\mathbf{115_1}$-$\mathbf{115_n}$ facilitates management of the vehicle information that has been transmitted from a multiplicity of vehicles. For example, a vehicle information collection server that collects information of categories relating to the wear and tear on a vehicle may provide vehicle information only to, for example, servers of automobile manufacturers that require vehicle information of these categories. Alternatively, the provision of a plurality of service-providing centers $\mathbf{116_1}$-$\mathbf{116_m}$ enables a user to receive a multiplicity of provided services.

Although an example has been described in the present embodiment in which vehicle 10 transmits vehicle information to the vehicle information collection center that corresponds to the category of vehicle information, i.e., in which vehicle information collection centers $\mathbf{115_1}$-$\mathbf{115_n}$ are provided according to categories, vehicle information collection centers $\mathbf{115_1}$-$\mathbf{115_n}$ need not correspond to categories of vehicle information. For example, vehicle 10 may also transmit vehicle information to any one or a plurality of vehicle information collection centers without making particular distinctions between vehicle information collection centers $\mathbf{115_1}$-$\mathbf{115_n}$.

Fourth Embodiment

Figure 16:
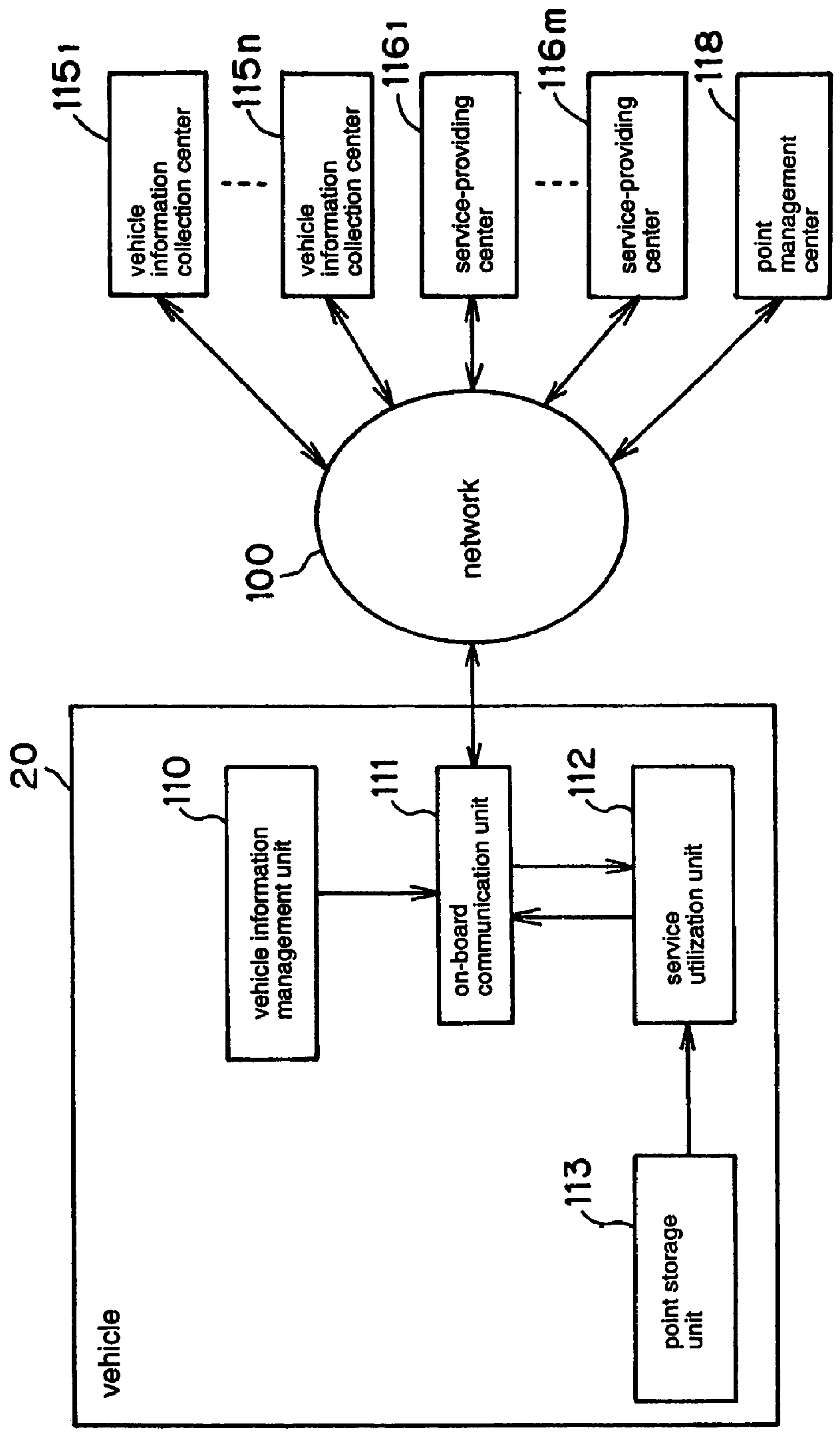
FIG. 16 is a block diagram showing the vehicle information collection system according to the fourth embodiment of the present invention.

FIG. 16 shows a vehicle information collection system according to the fourth embodiment of the present invention. In the present embodiment, a plurality of vehicle information collection centers $\mathbf{115_1}$-$\mathbf{115_n}$ and a plurality of service-providing centers $\mathbf{116_1}$-$\mathbf{116_m}$ are provided as in the third embodiment, but point-managing center 118 is provided in place of point-issuing center 117 as in the second embodiment.

Accordingly, the configuration of the on-board device in vehicle 20 is the same as the configuration in the second embodiment, but when transmitting vehicle information in the present embodiment, vehicle information management unit 110 transmits vehicle information to the vehicle information collection center that corresponds to the category of vehicle information, as in the third embodiment. As in the second embodiment, when vehicle information is transmitted from vehicle 20, point-managing center 118 issues points according to the amount and/or the category and/or the value of the vehicle information and stores these points by vehicle or by user.

When a service is used, service utilization control unit 114 requests point-managing center 118 to transmit points to the service-providing center that provides the service that, for example, accords with the designation of the user. In accordance with the request, point-managing center 118 transmits points to the designated service-providing center, whereupon the service-providing center, having received the points, transmits the content of the service to vehicle 20.

In the present embodiment, as in the third embodiment, the provision of a plurality of vehicle information collection centers $\mathbf{115_1}$-$\mathbf{115_n}$ facilitates the management of vehicle information that is transmitted from a multiplicity of vehicles. In addition, the provision of a plurality of service-providing centers $\mathbf{116_1}$-$\mathbf{116_m}$ enables users to receive a multiplicity of provided services.

Although a plurality of vehicle information collection centers and service-providing centers are provided in the third embodiment and fourth embodiment, a configuration is also possible in which a plurality of only one of the vehicle information collection centers and service-providing centers is provided.

Fifth Embodiment

Although vehicles 10 and 20 received services that were provided as online content from service-providing centers according to points in the first to fourth embodiments, the provided services are not limited to online content. For example, points can be used at service stations that exist on a route of travel.

Figure 17:
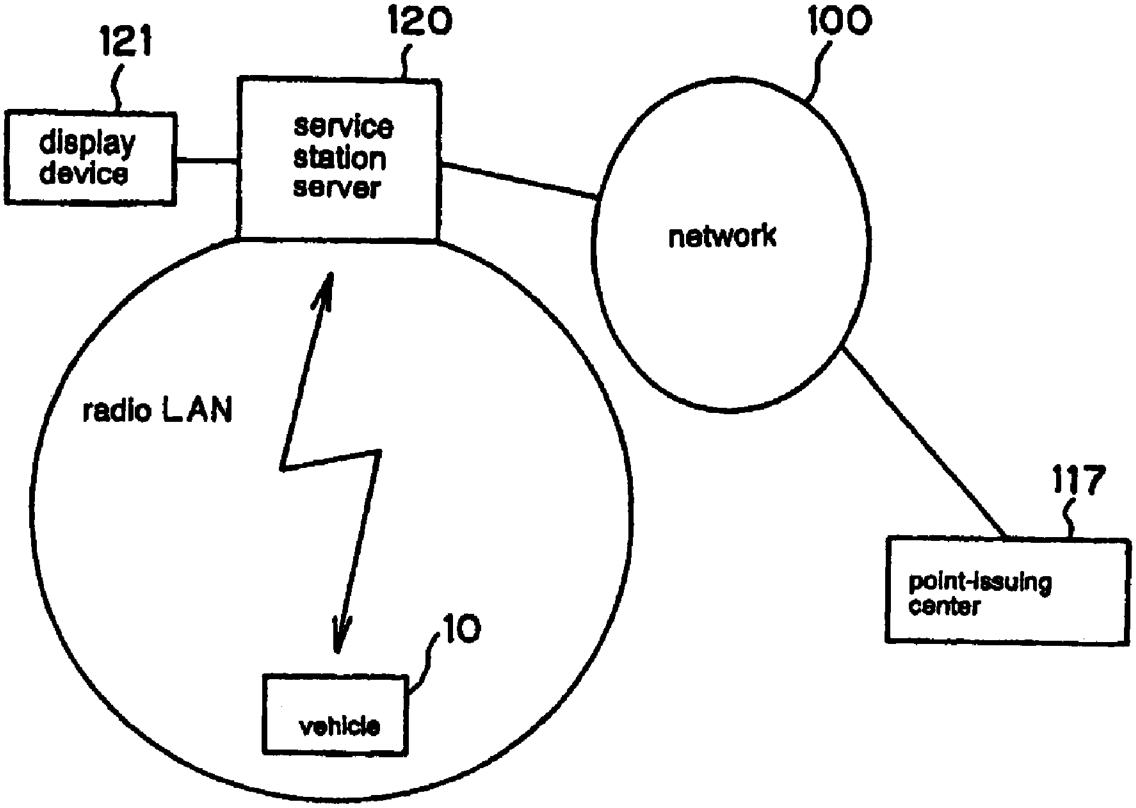
FIG. 17 is a block diagram showing the vehicle information collection system according to the fifth embodiment of the present invention.

FIG. 17 shows a wireless LAN that is established in a service station and the progress of vehicle 10 within the radio zone. Although omitted in FIG. 17, vehicle information collection center 115 that can connect to network 100 is also present in the system. On-board device on-board 10 has a configuration such as shown in FIG. 1, but in this embodiment, on-board communication unit 111 includes the capability to connect to the wireless LAN. Service station server 120 accesses point storage unit 113 by way of the wireless LAN and on-board communication unit 111 of vehicle 10 and, by way of on-board communication unit 111, receives the vehicle ID and the number of points that have been accumulated from vehicle 10. Information indicating the services that can be provided according to the number of points is then displayed on display device 121. Display device 121 is of a size sufficient to allow the user inside vehicle 10 (the driver) to read the displayed content. In this case, an example is presented in which the service that can be provided according to the number of points is an amount of gasoline that can be exchanged.

According to a configuration of this nature, the user of vehicle 10 that has entered the grounds of a service station can immediately ascertain the amount of gasoline that can be exchanged. If the user wishes to exchange points for gasoline, service station server 120 then issues a command to subtract points to point storage unit 113 of vehicle 10 by way of the wireless LAN and on-board communication unit 111 of vehicle 10.

This configuration allows points to be utilized for promoting the business of a service station. The operators of the service station at a later date receive the cash amount that offsets the points that have been exchanged for gasoline from the administrators that operate the system.

Although a service station has been used here as an example of a service other than online content, such services are not limited to the exchange of gasoline.

Points that have been stored can also be linked to a service in another system. For example, if on-board communication units 111 of vehicles 10 and 20 are of a configuration that allow the use of packet communication of portable telephones, a configuration is possible in which, for example, a content download service that is provided in a portable telephone network can be received in accordance with points that have been stored.

Vehicle information collection center 115 is configured so as to supply vehicle information to a server, such as the server of a roads administration agency that does not offer service directly to the users of vehicles 10 and 20. However, it can be assumed that, if no countermeasure is taken, users will not provide vehicle information that has no direct relation to their own benefit. This tendency is particularly strong when a service that meets users' own needs is not provided from service-providing center 116. In such a case, the vehicle information that vehicle information collection center 115 provides to the server of, for example, a roads administration agency, will be quite limited.

In each of the above-described embodiments, however, points are issued in accordance with the amount and/or the category and/or the value of vehicle information that vehicles 10 and 20 provide, whereby vehicle information collection center 115 can collect a large amount of information even if service-providing center 116 does not offer a service that meets the needs of the owners of vehicles 10 and 20. As a result, a multiplicity of servers will desire information provided from vehicle information collection center 115 and the operators of the system can realize sufficient profits to offset the points that are issued to users (when stored information is provided to servers for a consideration).

In addition, users can use points that have been stored to freely receive provided services without regard to the category of the vehicle information that is provided or the time the information is provided. For example, a user can receive a provided service at any time or at any place regardless of the location or time that the vehicle information was transmitted.

When preparing road traffic information based on vehicle information, service-providing center 116 prepares the road traffic information based on a large amount of information and can thus improve the reliability of the road traffic information. In addition, both the area and the time that are covered by the road traffic information can be expanded. Further, the ability to collect a wide variety of vehicle information enables service-providing center 116 to diversify the categories of provided services when preparing the service content based on vehicle information.

While preferred embodiments of the present invention have been described using specific terms, such description is for illustrative purposes only, and it is to be understood that changes and variations may be made without departing from the spirit or scope of the following claims.

What is claimed is:

1. A vehicle information collection system for receiving vehicle information of a plurality of vehicles by way of a communication network and storing said vehicle information, said vehicle information collection system comprising:

a vehicle information collection device for collecting vehicle information from vehicles by way of a communication network, said vehicle information collection device transmitting to other devices that are connected by way of said communication network vehicle information according to categories that these other devices require;

a point-issuing device connected to said vehicle information collection device by way of said communication network for conferring points to vehicles according to said vehicle information, said point-issuing device including:

(a) communication means for receiving indication by way of said communication network that said vehicle information collection device has received vehicle information from a vehicle; and (b) point-issuing means for conferring points to a vehicle according to the amount and/or the category and/or the value of vehicle information that has been received by way of the communication means; and an on-board device including a vehicle information management means for collecting vehicle information and automatically outputting the vehicle information, without initial user selection of whether to provide the vehicle information, based on predetermined conditions, and an on-board communication means for transmitting vehicle information that has been collected by said vehicle information management means to said vehicle information collection device by way of said communication network, wherein:

said on-board device further includes a point storage means, and said on-board communication means receives points from said point-issuing device by way of said communication network and supplies the received points to said point storage means; and said point-issuing device further includes a point storage unit for storing points that have been issued for each vehicle or for each user.

2. A system according to claim 1, further comprising a service-providing device that is connected to said vehicles by way of said communication network for providing a service according to points that have been issued by said point-issuing device;

wherein said on-board device further includes: service utilization control means for instructing the use of a service according to points that have been issued; and service utilization means for receiving a service from the prescribed service-providing device in accordance with instructions from said service utilization control means.

3. A system according to claim 1, wherein: said system is provided with a plurality of vehicle information collection devices, and said on-board communication means transmits vehicle information that has been collected by said vehicle information management means to any vehicle information collection device among said plurality of vehicle information collection devices.

4. A system according to claim 2, wherein: said system is provided with a plurality of service-providing devices for providing different services; and said service utilization control means designates any of said plurality of service-providing devices and instructs the utilization of a service.

* * * * *